(No Model.)  McC. YOUNG.  7 Sheets—Sheet 1.

APPARATUS FOR FILLING MATCH SPLINTS FOR DIPPING.

No. 271,563.  Patented Jan. 30, 1883.

WITNESSES
Wm A. Skinkle
Edwin A. Newman.

INVENTOR
McClintock Young
By his Attorneys
Baldwin, Hopkins & Peyton.

(No Model.)
7 Sheets—Sheet 4

McC. YOUNG.
APPARATUS FOR FILLING MATCH SPLINTS FOR DIPPING.

No. 271,563. Patented Jan. 30, 1883.

WITNESSES

INVENTOR
McClintock Young
By his Attorneys.

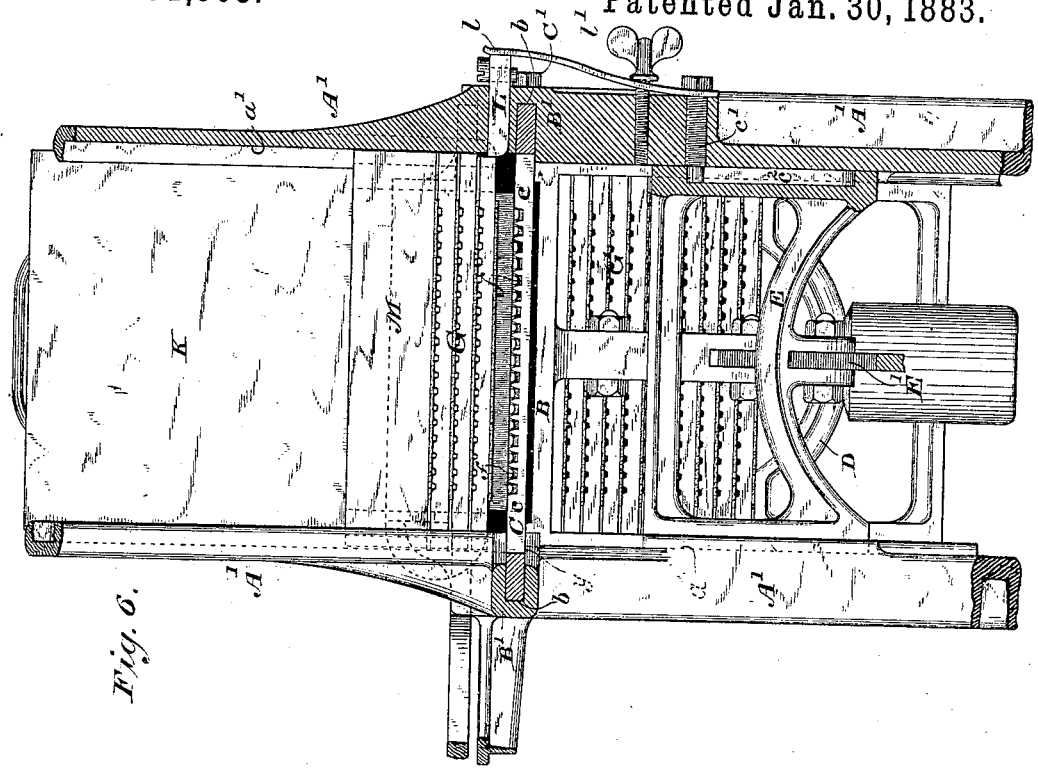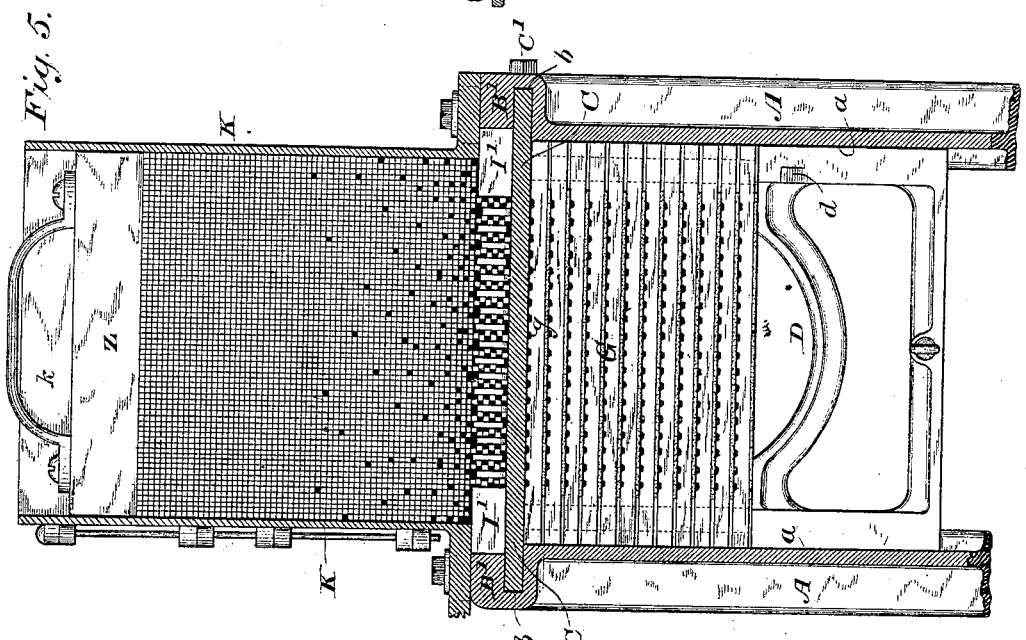

(No Model.)
7 Sheets—Sheet 6.
McC. YOUNG.
APPARATUS FOR FILLING MATCH SPLINTS FOR DIPPING.
No. 271,563.   Patented Jan. 30, 1883.
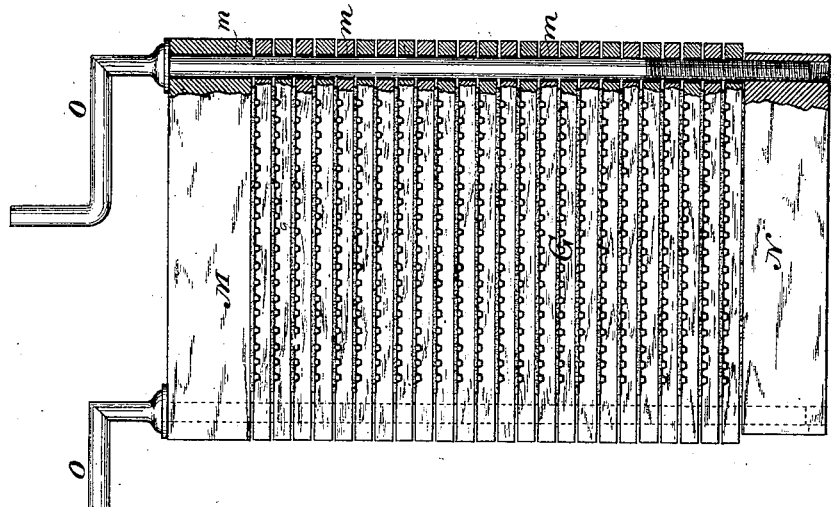
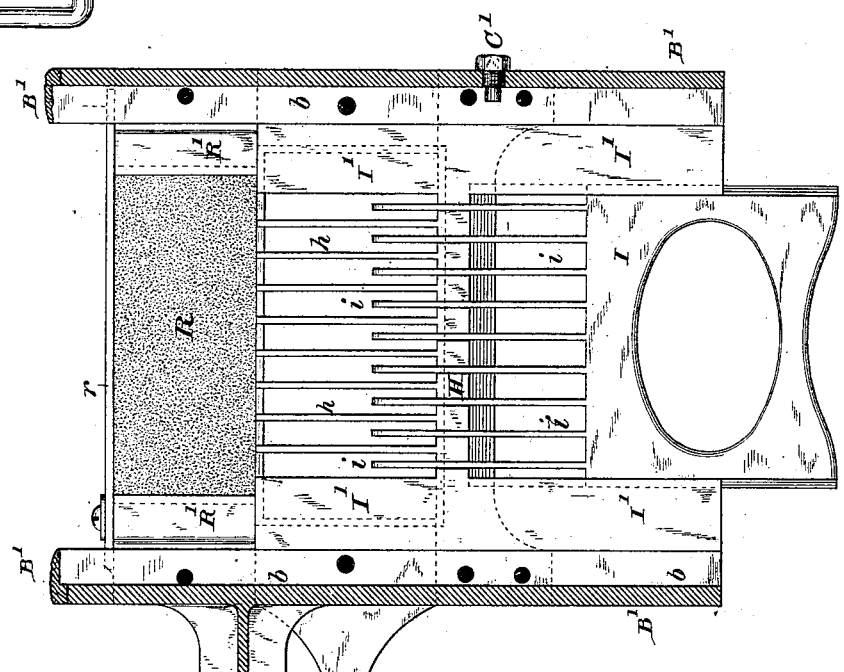
WITNESSES
INVENTOR
McClintock Young
By his Attorneys

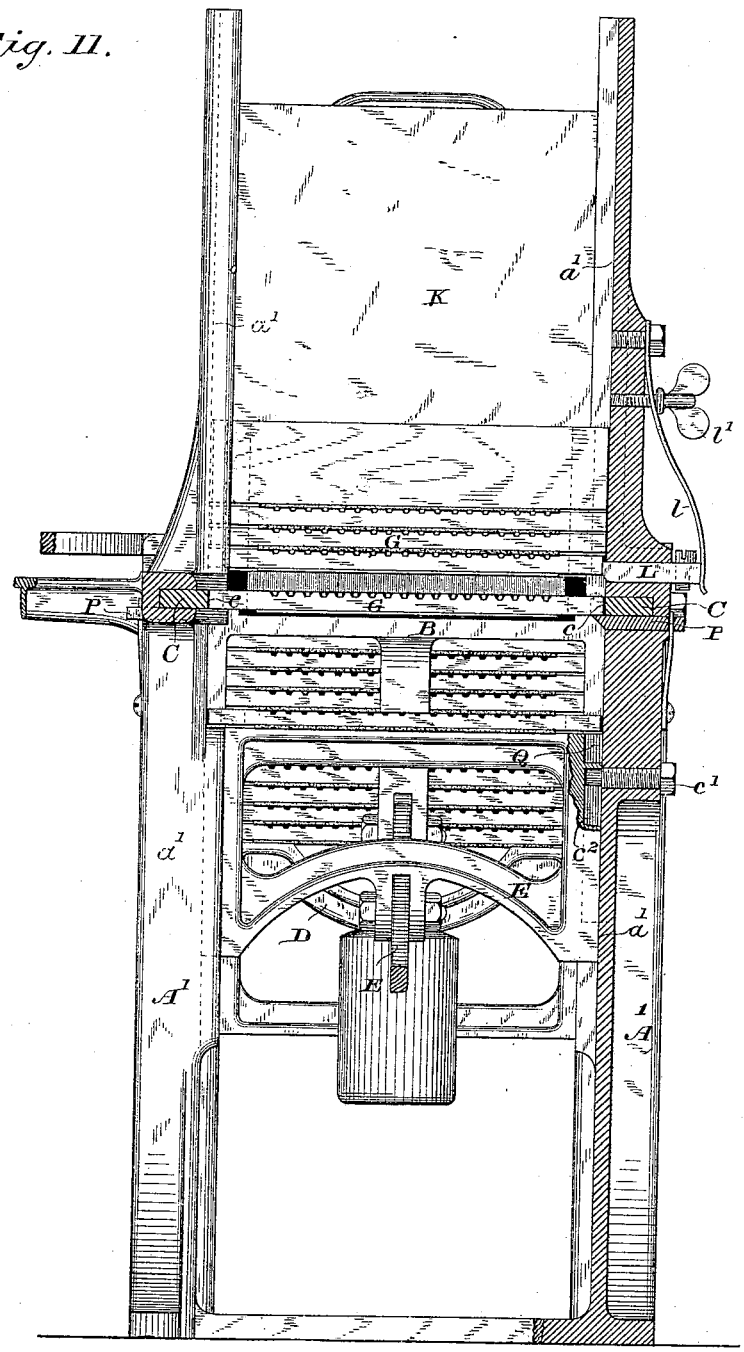

UNITED STATES PATENT OFFICE.

McCLINTOCK YOUNG, OF FREDERICK, MARYLAND, ASSIGNOR TO THE DIAMOND MATCH COMPANY, OF CONNECTICUT.

APPARATUS FOR FILLING MATCH-SPLINTS FOR DIPPING.

SPECIFICATION forming part of Letters Patent No. 271,563, dated January 30, 1883.

Application filed November 20, 1882. (No model.)

*To all whom it may concern:*

Be it known that I, McCLINTOCK YOUNG, of Frederick, in the county of Frederick and State of Maryland, have invented certain new and useful Improvements in Apparatus for Filling Match-Splints for Dipping, of which the following is a specification.

My improved machine has nothing to do with the making of the match-splints, but is for the purpose of handling the splints and arranging them for dipping, which latter operation may be performed in any suitable manner, either by hand or by any machine capable of handling the splints in the shape they come from my machine.

Figure 1:
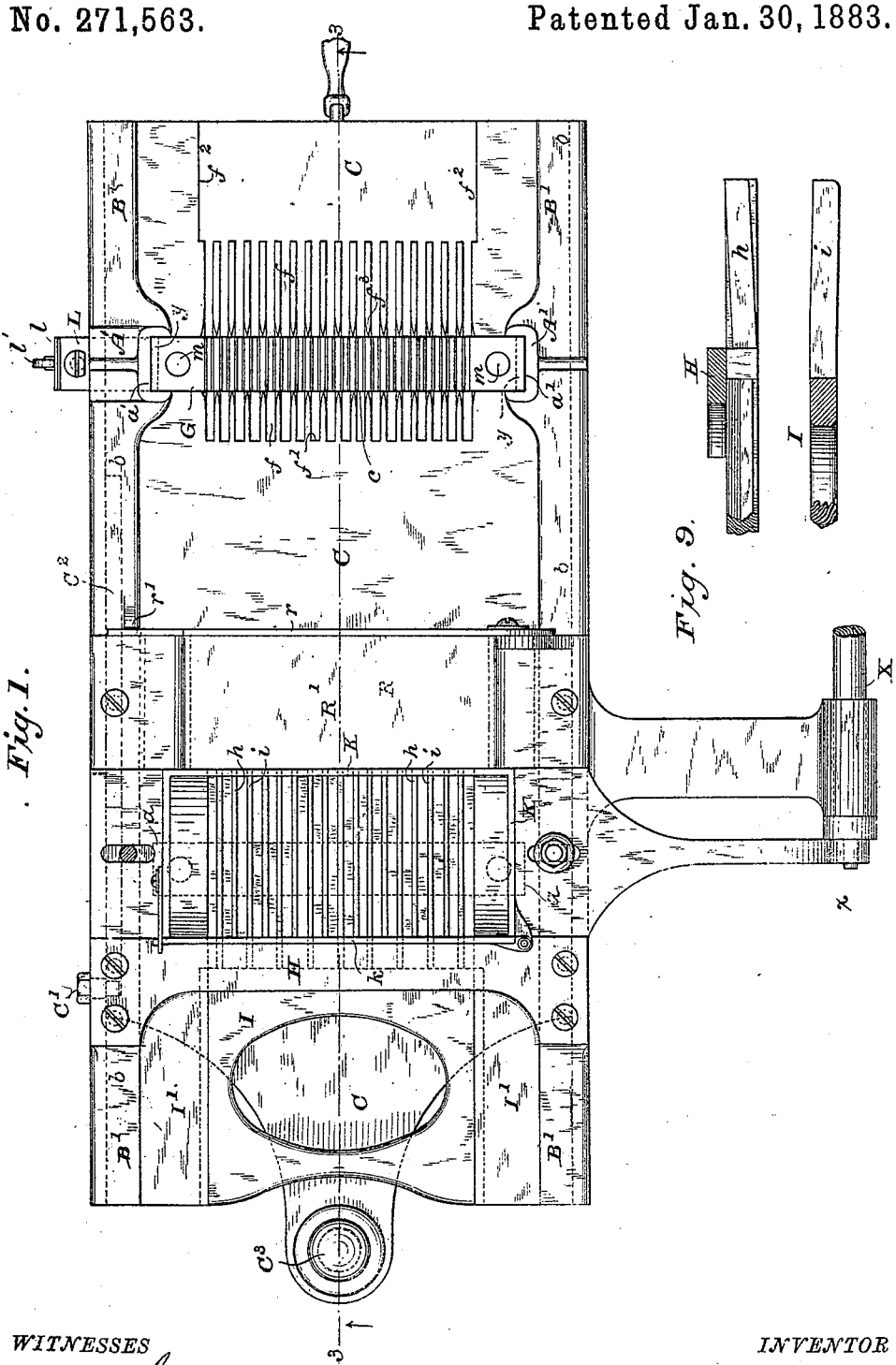
Figure 2:
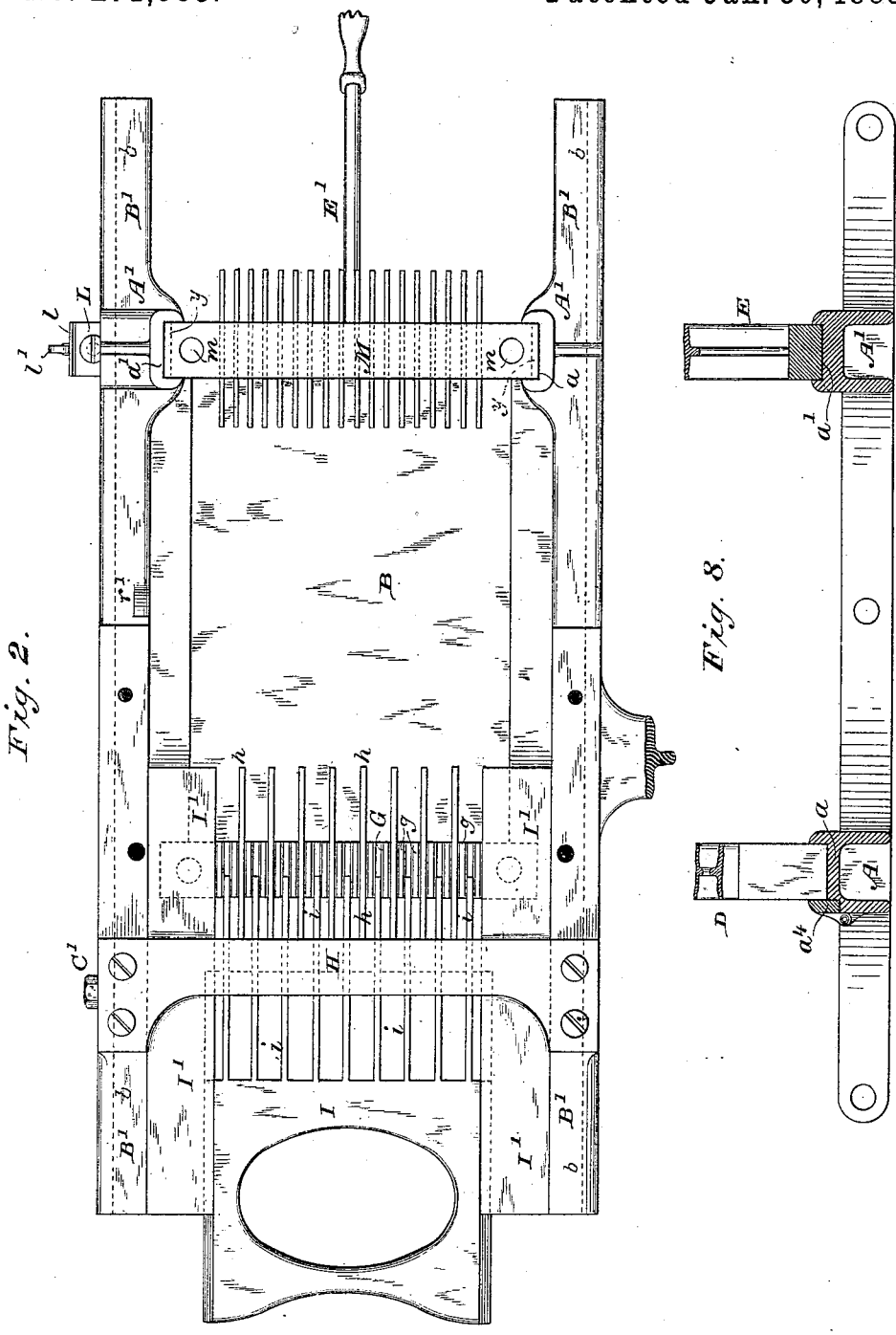
Figure 3:
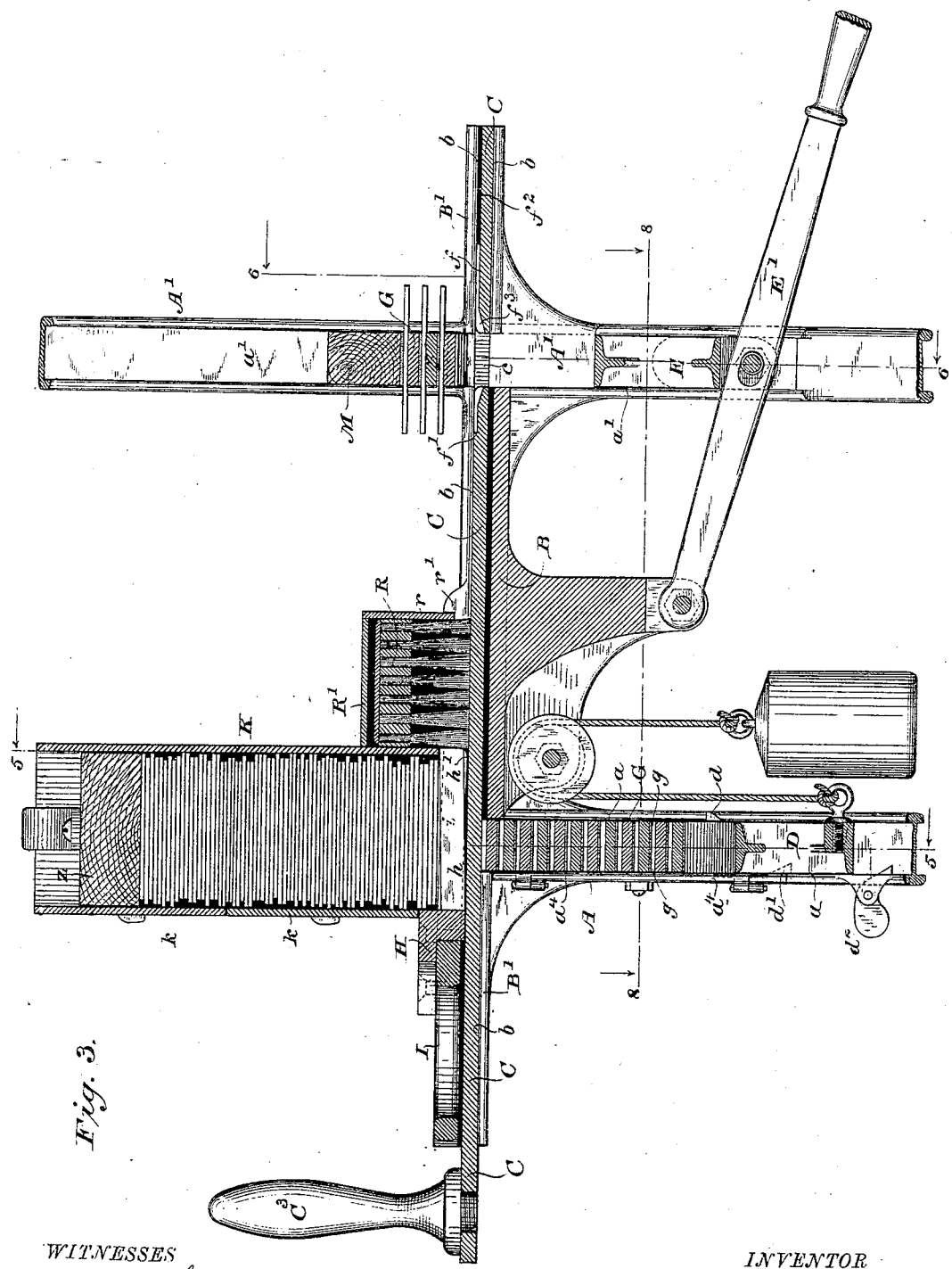
Figure 4:
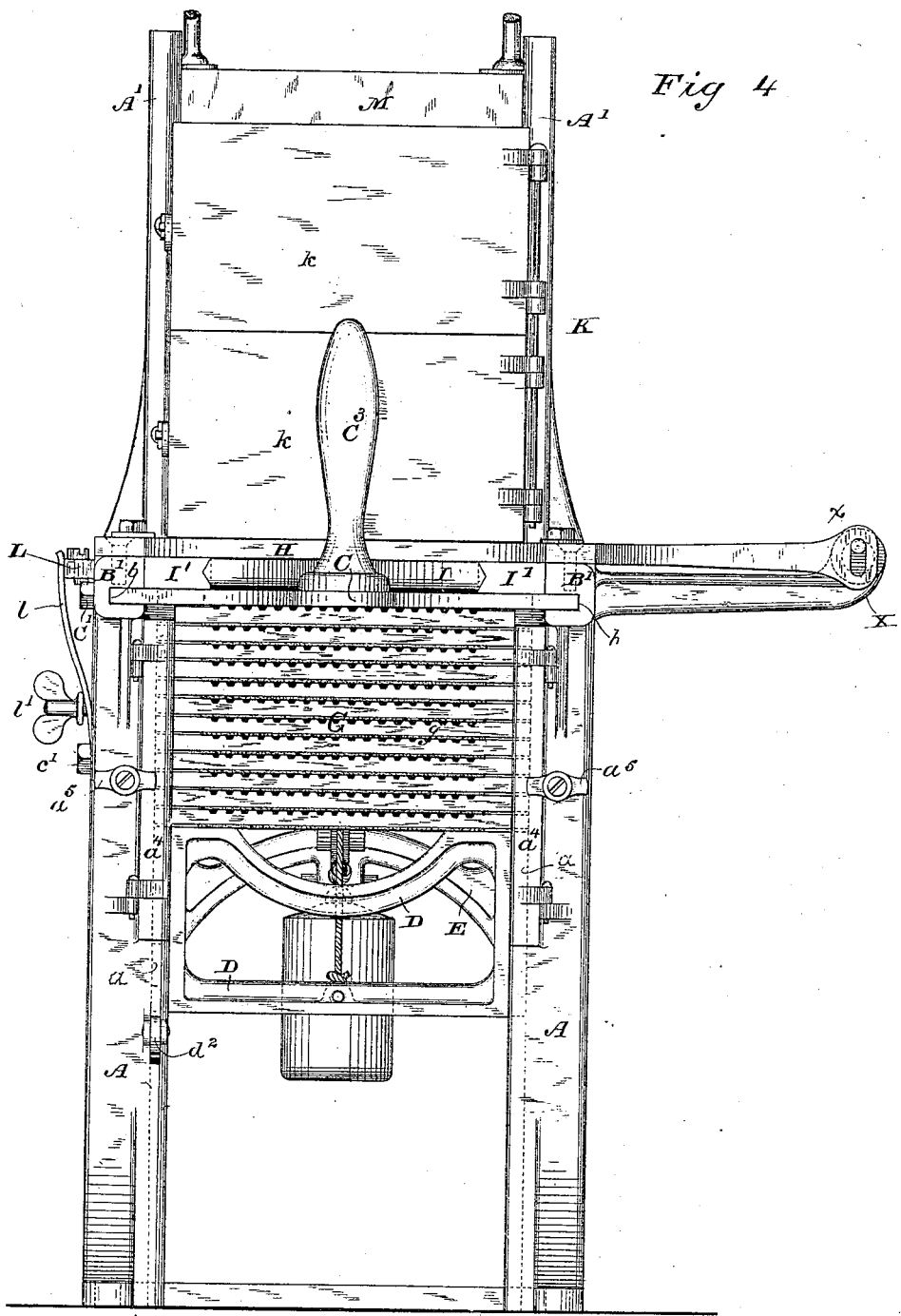

In the accompanying drawings, Figure 1 is a plan view; Fig. 2, a similar view, with the brush, brush-box, and hopper removed, showing the slide which carries one set or series of the tongues or fingers which form the bottom of the hopper drawn out somewhat, to more clearly show the construction. Fig. 3 is a central longitudinal section on the line 3 3 of Fig. 1; Fig. 4, a front elevation; Fig. 5, a transverse section on the line 5 5 of Fig. 3; Fig. 6, a transverse section on the line 6 6 of Fig. 3; Fig. 7, a detail inverted plan view, showing the brush and the tongues or fingers which form the bottom of the hopper with the series of tongues carried by the slide drawn out, as shown in Fig. 1. Fig. 8 is a detail view about the line 8 8 of Fig. 3; Fig. 9, a detail view, partly in section, showing the slide and the frame carrying the two sets or series of fingers or tongues which form the bottom of the hopper; Fig. 10, a detail view, showing a stack of the independent slats or rack-bars which carry the match-splints bound together by clamping-bolts with the splints ready for dipping; and Fig. 11 is a view of a somewhat-modified construction, in which the mechanism for automatically feeding the slats or rack-bars up under the hopper is dispensed with and the feeding done by hand at the opposite end of the machine by means of a follower which raises the slat filled with splints up into the guideway, where they are stacked ready for clamping together.

The object of my invention is to prepare matches for dipping by arranging them in a mass so that each match will be held separate and distinct from every other one, in order that they may be dipped in the most perfect manner. I accomplish this by filling a number of slats or racks with match-splints, piling the slats when thus filled, and then firmly binding them together.

My invention consists in the novel organizations of apparatus by means of which the slats are fed to the machine, filled with the splints, the splints evened up, and the slats stacked and bound together as mentioned, all of which will be specifically claimed.

The frame of the machine, which may be constructed in any suitable manner, but is preferably made of cast-iron, as indicated in the drawings, consists of four or more upright supporting-standards, A A', a bed-plate, B, which may either be cast with the standards or formed separately and secured thereto, and side bars or beams, B', which may either be portions of the bed-plate or formed separately. The rear pair of standards, A', extend up beyond the bed-plate. The side beams, B', of the frame are provided with guideways $b$, in which a reciprocating plate or slide, C, moves. This slide is provided with a transverse slot, $c$, which registers at each end of its stroke alternately with the guideways $a$ and $a'$, formed in the standards or uprights A A' of the main frame. The movement of the slide at each end of its stroke is limited by a bolt or pin, C', on the frame, which projects into a recess, C², in the side of the reciprocating slide. The standards A are provided with guideways $a$ on their inner faces, with which the slot in the slide registers at one end of its stroke. Similar guideways, $a'$, are provided on the inner faces of the rear pair of standards, A'.

A follower, D, travels in the guideways $a$ $a$ in the standards A, and is constantly drawn upward by means of a cord and weight, as indicated in the drawings, its motion in that direction, however, being limited by a suitable stop, $d$, so that its upper edge can never rise farther than to be flush with the upper face of the bed-plate. A dog, $d^2$, pivoted in one of the standards, A, engages in a notch, $d'$, in the follower, so that it may be held down, when desired, for the purpose hereinafter described.

A plunger, E, travels in the guideways $a'$ $a'$ in the rear pair of standards, A', and is moved up and down by a pivoted hand-lever, E', as clearly illustrated in Fig. 3, its upward motion being limited by a screw or bolt, $c'$, on the frame, which projects into a recess, $c^2$, in the side of the plunger. The upper face of the slide C, on each side of the transverse slot $c$, is formed with a series of grooves, $f$, which run at right angles to the transverse slot, the grooves on one side of the slot registering with those on the opposite side. The forward ends, $f'$, of the grooves, or those to the left, as viewed in Fig. 1, are closed by shoulders formed by the uncut face of the slide, while the opposite ends are open, the face of the slide being countersunk or cut away, as indicated at $f^2$ in the drawings. The bottoms of the grooves and the edges of the ribs are preferably beveled, as at $f^3$, at the edge of the transverse slot in the slide C.

The match-splints, as will hereinafter be described, are carried in or upon grooved slats or rack-bars G, such as indicated in Figs. 1, 2, 3, and 10. These slats or racks are of a size to fit the transverse slot $c$ in the slide and guideways $a$ $a'$ in the standards A A'. They are formed with transverse grooves $g$, which come in line with the grooves $f$ in the slide when the slats are in the transverse slot $c$ in the slide.

A cross-piece, H, is bolted to the side beams, B', of the frame somewhat in front of the guideway $a$ in the standards A, as indicated more especially in Fig. 2. From the under side of this cross-piece flat fingers or tongues $h$ project over the guideway $a$. Another set of similar fingers, $i$, carried by a sliding plate, I, which moves in V-shaped guide-grooves in plates or bars I', carried by the cross-piece H, or suitably secured on the frame, fit between the tongues $h$ when the slide is thrust forward, as shown in Figs. 1 and 3. As before remarked, for the purpose of more clearly illustrating the construction in Figs. 2 and 7, the slide I is drawn out somewhat. It will be observed upon reference to Fig. 3 that the ends of the flat tongues $i$ are elevated slightly above the ends of the other set, $h$, and that the bottom corners at the ends of the tongues $h$ are rounded or beveled off, as indicated at $h'$. The purpose of this construction will be described hereinafter.

Immediately above the tongues $h$ $i$, which are directly over the guideway $a$, the hopper K, for the reception of the match-splints, is placed. The hopper is mounted upon the frame, so as to be capable of a slight transverse reciprocation, which is imparted to it by means of an eccentric, $x$, and a shaft, X, mounted in suitable bearings. The hopper is preferably open at the top, and is provided at the side with two swinging doors, $k$, as illustrated in the drawings, to permit the ready deposit of the match-splints therein. Just beyond the hopper, or to the right thereof, as viewed in the drawings, a suitable brush, R, is placed, so as to sweep the face of the reciprocating slide as it moves back and forth. This brush may be secured upon the frame in any suitable way, but is shown as contained in a brush-box, R', having a vertically-swinging door or side, $r$, pivoted on one side of the box and held against lateral motion by a notch, $r'$, at its opposite end, as clearly indicated in Figs. 1 and 3.

Upon reference more especially to Figs. 3 and 4 it will be observed that a portion, $a^4$, of each of the beads or strips $a$ on the standards A A, which form one side of the guideway in said standards, are hinged, so that they will swing open and permit the ready insertion of a stack or pile of slats for holding the match-splints, as indicated in the drawings.

The top of the follower D is recessed in the middle, so as to make room for the hand of the operator and facilitate the insertion of the slats. When the slats are inserted the swinging portions $a^4$ of the guideway are secured by suitable catches, $a^5$.

The shaft X, which causes the transverse reciprocation of the hopper, may be actuated in any suitable way. The slide C is shown as provided with a hand-piece, $C^3$, by means of which it can be moved back and forth, and the plunger E is also shown as operated by a hand-lever. Obviously, however, by means of suitable gearing and mechanism the relative timely motions of the respective parts may be accomplished automatically by machinery. I have shown the parts actuated as indicated in the drawings for the purpose of simplicity.

The stacked or grooved slats or rack-bars G will constantly be pressed upward by the follower D, and with the slide C drawn out to the left, as viewed in the drawings, so that the transverse slot $c$ will register with the guideway $a$, and the upper slat will fit in the transverse slot $c$ in the slide. The hopper or receptacle is filled with match-splints, and by preference a follower, Z, is placed in the hopper upon the splints in order to press them down somewhat. The hopper, being transversely reciprocated, will agitate the splints contained therein and cause them to fill the spaces between the tongues, and a splint will be deposited in each of the grooves in the slat and slide C, which have been fully described.

The different elevations of the ends of the tongues $h$ and $i$ hereinbefore referred to, and illustrated more especially in Fig. 3, will tend to straighten the splints and cause them more readily to descend into the spaces between them and rest in the grooves in the slat and slide; and in case of any clogging or binding of the splints between the tongues they may be loosened and caused to freely descend by moving the slide I and reciprocating the tongues $i$ back and forth. The under corners of the ends of the tongues $h$, which are in quite close proximity to the slide C, are beveled or cut away, so as to prevent any possibility of their catching upon the slide as it is reciprocated. The grooves in the slat and slide-plate C being filled with the splints, the slide carrying the slat is caused to travel toward the standards A', or to the right, as viewed in the drawings, and the match-splints coming in contact with the brush which sweeps the face will be arranged accurately in the grooves, and will be forced back or evened up against the square shoulders $f'$ of the grooves, and any splints which the slide might tend to carry forward from the hopper other than those contained in the grooves will be brushed back.

It will be observed that the center of the bed-plate is depressed or cut away in the center, leaving a ledge, $b^2$, on each side, upon which the ends of the slats rest and slide as they are carried along by the slide C, so as to hold the under faces of the slats, which are covered with felt or elastic material, out of contact with the bed-plate. The central portion of the bed-plate is therefore not a necessary portion of the machine, and may be dispensed with and the frame tied by suitable cross-pieces. At the end of this stroke of the slide the transverse slot $c$ will register with the guideway $a'$ and will rest on the shoulders $y$, formed by the enlargement or greater width of said guideway above the bed-plate, and when the plunger E is caused to rise it will lift the slat, now carrying a splint in each groove out of the slot in the slide up into the guideway $a'$, where it will be firmly held by a snubbing-nose or spring-clamp, L, which projects through the standard into the guideway, as illustrated more especially in Fig. 6. This nose is operated by a spring, $l$, secured by the bolt $c'$, and capable of being adjusted by a thumb-screw, $l'$, to compensate for wear and diminution of the force of the spring. The plunger E descends, leaving the rack carrying the splints held in the guideway $a'$ above the slide, and the motion of the slide is reversed until its slot again registers with the guideway $a$, when the next slat rises, as just described. This slat, filled with splints, in like manner is carried forward, and, being raised by the plunger E, lifts the previous slat, and is in turn firmly held by the spring nose or clamp L. This operation is continued until a suitable pile or stack of slats carrying match-splints is contained in the guideway $a'$. As the splints carried by each slat have all been evened up by the brush forcing them against the shoulders $f'$ of the grooves, the ends of all the splints carried by the pile of slats will be perfectly even, or in the same vertical plane.

In order that the slats may not bruise the splints, and also in order that the splints may be firmly held between each pair of slats, the bottom of each slat is provided with a suitable felt or elastic covering, which compensates for any inequalities; and in order to prevent the possibility of disturbance or displacement of the splints as the slats are raised into the guideway $a'$, a block, M, is preferably placed in the guideway, and rises as the slats accumulate, maintaining them under a slight pressure. It may not be necessary, however, to place this block in the guideway until it is desired to remove the stack of splints therefrom. This is accomplished in the following manner: The block M, as well as each of the splints, is provided with a bolt-hole, $m$, at each end, as clearly indicated in the drawings. When a sufficient number of slats carrying splints has been accumulated, a block, N, having corresponding screw-threaded bolt-holes, is placed upon the plunger E and raised up against the bottom of the stack. One side of the guideway $a'$ is cut away a sufficient distance from the bed-plate or slide downward to permit the insertion of this block. The entire series or stack of slats may now be firmly bolted together by means of screw bolts or rods O, when the whole stack may be removed from the guideway without danger of displacement, and dipped in any suitable manner, as heretofore mentioned.

In Fig. 11 I have illustrated an organization of a machine in which the automatic feeding of the slats by means of the follower D may be dispensed with. Under this organization no guideway in the standards A is required, but the feeding of the slats is done by hand by means of the plunger E. I accomplish this operation in the following manner: The parts of the apparatus at this end of the machine are similar to those illustrated in the other figures, with the exception that for the purpose of convenience of construction the spring $l$, which operates the snub-nose L, is inverted and secured on the standard above the bed-plate. In each of the guideways $a'$, flush with the bed-plate, a spring-latch, P, is provided, and so placed, as indicated in the drawings, that when the splint-slat which is fed in from this end of the machine on top of the plunger E is raised beyond the latches they will spring out and hold the slat in the slot $c$ of the slide just flush with the face of the bed-plate. The slat will now be carried by the slide under the hopper filled with splints, as hereinbefore described, and on the reverse motion of the slide returned to the guideway $a'$; and when the next slat is raised by the plunger E the first slat, which has been filled with splints, will be lifted into the guideway $a'$ and held by the nose L, as hereinbefore described, while the second slat, which will now be held in the slot $c$ in the slide by the spring-latches, will be carried forward by the slide and filled with splints.

In order to make the spring-latches P with broad lips or edges so as to afford a broad, firm support for the slats, I form recesses Q in each side of the plunger E, so that as the plunger raises the slats they will snub back the latches, but when the slats have passed the latches they will immediately spring out and support them.

The bed-plate may of course be extended beyond the standards and slotted to correspond with the guideways $a$ $a'$.

It will be obvious that a machine may be thus organized for operation without departing from the principle of my invention, so far as some of its leading features are concerned.

Many of the details of the organization herein shown and described may of course be changed without departing from the spirit of my invention, the leading features of which are exhibited more especially by the operations performed and the results accomplished, rather than by the special organization of apparatus, although much of the apparatus is novel, and is herein specifically claimed. Such changes will readily be suggested to mechanicians skilled in the art to which my invention relates, and may involve changes in many portions of the machine.

What I claim as my invention is—

1. The combination, substantially as set forth, of mechanism for bringing the splint-carrying slats successively under the hopper or receptacle, mechanism for arranging a given number of splints symmetrically on each slat, and mechanism for removing the slats from beneath the hopper and then stacking them.

2. The combination, substantially as set forth, of mechanism for feeding or bringing the splint-carrying slats successively under the splint hopper or receptacle, mechanism for arranging a given number of splints on each slat, means for evening up the splints on the slats, and mechanism for stacking the slats.

3. The combination, substantially as set forth, of the frame, mechanism for feeding the splint-carrying slats, the reciprocating slide having the transverse slot which holds the splint-carrying slats under the splint hopper or receptacle, mechanism for arranging a given number of splints on each slat, means for evening up the splints on each slat, and the mechanism for stacking the slats, as described.

4. The combination, substantially as set forth, of the frame, mechanism for feeding the splint-carrying slats, the reciprocating slide having a transverse slot for containing the splint-carrying slats, the hopper, mechanism for agitating it, a series of flat tongues at the bottom of the hopper, between which the splints are directed to the splint-carrying slats, a brush or elastic device for evening up the splints on each slat, the guideway in which the slats are stacked, and the plunger for stacking them.

5. The combination, substantially as set forth, of the frame, the reciprocating transversely-slotted slide, the feeding-guideway for holding the splint-carrying slats, a follower for automatically feeding the slats under the hopper into the slotted slide, mechanism for arranging the splints on the splint-carrying slats, a brush or yielding device for evening up the splints on each slat, the guideway in which the slats are stacked, and the plunger for stacking them.

6. The combination, substantially as set forth, of the hopper, the double series of flat tongues arranged at the bottom of the hopper, and a moving slide or bar on which one of the series is carried.

7. The combination, substantially as set forth, of the hopper, mechanism for agitating it, a grooved splint-carrying device beneath the hopper for the reception of a given number of splints, and the flat tongues arranged at the bottom of the hopper, between which the splints pass, and by which they are directed sidewise into the grooves in the splint-carrying device.

8. The combination, substantially as set forth, of the hopper, mechanism for agitating it, and a double series of flat fingers arranged alternately with reference to each other at the bottom of the hopper, the ends of one series of fingers being elevated somewhat above those of the other.

9. The combination, substantially as set forth, of a reciprocating slide having upon its face a series of grooves for the reception of match-splints, and mechanism for alternately depositing the splints in the grooves and removing them therefrom.

10. The slotted reciprocating slide C, having series of grooves therein, the ends of the grooves at one side being closed and at the opposite side open or unobstructed, for the purpose set forth.

In testimony whereof I have hereunto subscribed my name.

McCLINTOCK YOUNG.

Witnesses:
ROBERT STOKES,
C. M. GILPIN.